United States Patent
Rudy et al.

(10) Patent No.: US 7,845,853 B2
(45) Date of Patent: Dec. 7, 2010

(54) HYDROSTATIC BEARING

(75) Inventors: Dietmar Rudy, Kleinbundenbach (DE); Wolfgang Bauer, Riegelsberg (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 453 days.

(21) Appl. No.: 11/915,397

(22) PCT Filed: May 20, 2006

(86) PCT No.: PCT/EP2006/004796

§ 371 (c)(1),
(2), (4) Date: Dec. 5, 2007

(87) PCT Pub. No.: WO2006/012557

PCT Pub. Date: Nov. 30, 2006

(65) Prior Publication Data

US 2008/0199111 A1      Aug. 21, 2008

(30) Foreign Application Priority Data

May 25, 2005   (DE) .................. 10 2005 023 998

(51) Int. Cl.
*F16C 32/06* (2006.01)
*F16C 29/00* (2006.01)

(52) U.S. Cl. .......................... 384/12; 384/55

(58) Field of Classification Search ........... 384/12, 384/13, 55
See application file for complete search history.

(56) References Cited

U.S. PATENT DOCUMENTS

| | | | | |
|---|---|---|---|---|
| 4,606,587 A | * | 8/1986 | Thompson | 384/12 |
| 4,978,233 A | * | 12/1990 | Stotzel et al. | 384/12 |
| 5,971,614 A | | 10/1999 | Kane et al. | |
| 5,980,110 A | | 11/1999 | Lyon | |
| 6,012,845 A | | 1/2000 | Lyon | |
| 2004/0042689 A1 | | 3/2004 | Wasson et al. | |

FOREIGN PATENT DOCUMENTS

| | | |
|---|---|---|
| DE | 3831676 | 1/1990 |
| DE | 3917673 | 6/1990 |
| EP | 0361026 | 4/1990 |
| EP | 0931949 | 7/1999 |
| JP | 03265713 | 11/1991 |
| WO | 0003148 | 1/2000 |

* cited by examiner

*Primary Examiner*—Thomas R Hannon
(74) *Attorney, Agent, or Firm*—Volpe and Koenig, P.C.

(57) ABSTRACT

A hydrostatic bearing for supporting horizontal and vertical forces, with a guide rail (2) and a support element (1) with a hydrostatic mounting on the guide rail, whereby the angle α between the head side and the lateral guide surfaces (6, 8) of the guide section (3) is greater than or equal to 35 degrees and less than or equal to 75 degrees, and the angle γ between the mounting surface (7) and the lateral foot surface (9) of the mounting section (4) is greater than or equal to 10 degrees and less than or equal to 25 degrees.

16 Claims, 2 Drawing Sheets

HYDROSTATIC BEARING

BACKGROUND

The present invention relates to a hydrostatic bearing for supporting horizontal and vertical forces.

From DE 38 31 676 C1, for example, a hydrostatic bearing is known, in which a support element is supported hydrostatically on a guide rail. The guide rail has a trapezoidal guide section and a trapezoidal mounting section. The two sections are turned toward each other with their tapered sides. A head-side guide surface of the guide section and a mounting surface of the mounting section are turned away from and arranged parallel to each other. Lateral guide surfaces of the guide section are each arranged at an acute angle to the upper guide surface. Lateral foot surfaces of the mounting section are arranged at an acute angle to the mounting surface. The two lateral guide surfaces of the guide section connect to both longitudinal sides or edges of the head-side guide surface, wherein an angle is enclosed between the lateral guide surface and the head-side guide surface.

The support element has two legs and a base connecting the two legs. With its two legs, the support element grips around the guide rail. The two legs and the base each feature a pressure pocket that can be pressurized hydrostatically for building up a hydrostatic pressure between the guide rail and the support element.

Such hydrostatic bearings feature lower load ratings in comparison with known linear guides with recirculating roller bodies. For linear roller bearings with recirculating roller bodies, the loads to be transmitted are transmitted between the support element and the guide rail via a plurality of rollers, which roll under load on tracks of the guide rail and the support element.

SUMMARY

The object of the present invention is to specify a hydrostatic bearing according to the features of the preamble of Claim 1, in which the carrying capacity is improved.

According to the invention, this objective is met in that the angle $\alpha$ between the head-side and the lateral guide surface of the guide section is greater than or equal to 35° and less than or equal to 75° and that the angle $\gamma$ between the mounting surface and the lateral foot surface of the mounting section is greater than or equal to 10° and less than or equal to 25°.

In the geometric formation of the guide rail and the support element provided here, it has been shown surprisingly that the carrying capacity is significantly increased in comparison with the hydrostatic bearing according to DE 38 31 676 C1. At the same hydraulic pressure, higher load ratings are achieved in comparison with the hydrostatic bearing according to DE 38 31 676 C1.

The hydrostatic bearing according to the invention can be constructed in its clearance profile like a standard profile rail guide according to DIN 645-1. In DIN 645, connection measures for the guide rail and the support element, as well as the outer dimensions of the system, are described.

An optimum for the formation and the carrying capacity of the hydrostatic bearing according to the invention is achieved when the angle $\alpha$ between the upper and the lateral guide surface of the guide section equals 55°.

The pressure pocket provided on the base of the support element can be divided by a separating ridge arranged along the guide rail. This separating ridge can be provided on its side facing the guide rail with a support surface for contacting the guide surface of the guide section. This improvement according to the invention guarantees an emergency-running property of the hydrostatic bearing. If an excessive pressure force is applied at a right angle to the upper guide surface of the guide section, under some circumstances, the pressure cushion set between the guide rail and the support element can be pressed together, so that the separating ridge is led with its support surface into contact with the guide rail. This contact is created such that another method of the support element is possible on the guide rail.

Preferably, the support element has a support body provided with the pressure pockets and two head pieces connecting to two end sides of the support body. Pressure channels connecting to the pressure pockets are provided, which are provided with chokes or flow control valves provided in at least one of the two head pieces for regulating the flow rate of hydraulic fluid. For problem-free adjustment of the hydrostatic bearing, the hydrostatic pressure can be set exactly in the three pressure pockets using the chokes or flow control valves.

Advantageously, the support element can also be provided with return channels, which open into at least one of the two head pieces, wherein returning hydraulic fluid can be discharged via a return location provided on the head piece. For better oil return, a suction pump can also be connected.

In a refinement according to the invention, the support element can be supplied further with two return channels, which are arranged longitudinal to the guide rail and which are each arranged in a corner region formed by the base and one of the two legs of the support element. In this corner region, the return channel can be formed as an open groove, which can be limited on its open longitudinal side by the guide rail.

In this case, it is especially favorable when the guide section of the guide rail has, in its edge region formed by the lateral guide surface and its head-side guide surface, a flattened section, which extends along the guide rail and which limits the return channel. The width of the flattened section is then dimensioned so that the clear opening width of the open groove is largely covered.

The support element can be provided on the free ends of its two legs with a longitudinal seal, which contacts the guide rail. This longitudinal seal can advantageously limit the return channel for the hydraulic fluid.

Furthermore, the head piece can be provided with a front seal, which wraps around the guide rail and which contacts the lateral and the head-side guide surface of the guide section of the guide rail. Advantageously, this front seal can limit a collection channel, which wraps around the guide rail and by which the hydraulic fluid is led from the return channels into a central return location of the head piece.

Between the trapezoidal guide section and the trapezoidal mounting section, a transition section can be provided, which connects the mounting section integrally to the guide section. The height of this transition section can vary as a function of the selected angle proposed according to the invention.

The transition section can be provided on its opposing longitudinal sides with straight or concave curved transition surfaces, which connect to the lateral guide surfaces of the guide section and to the lateral foot surfaces of the mounting section. These transition surfaces can be formed as contact surfaces for the longitudinal seals of the support element already explained above.

BRIEF DESCRIPTION OF THE DRAWINGS

The invention will be explained below with reference to an embodiment shown in a total of five figures. Shown are.

DETAILED DESCRIPTION OF THE PREFERRED EMBODIMENTS

Figure 1:
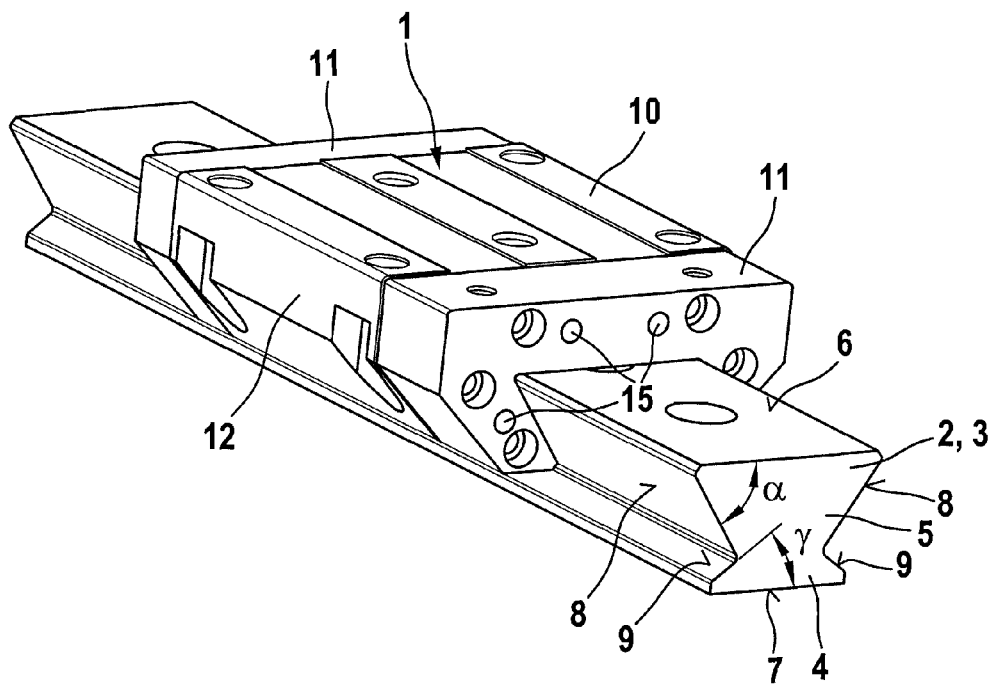
FIG. 1 a perspective view of a hydrostatic bearing according to the invention.
Figure 2:
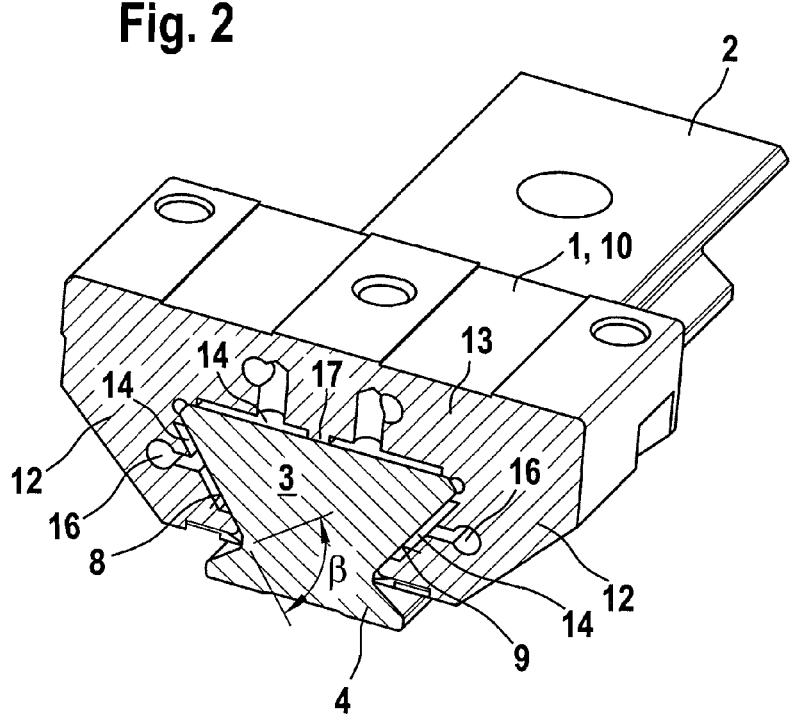
FIG. 2 another perspective view of the hydrostatic bearing according to the invention, FIG. 3 a view of the hydrostatic bearing according to the invention, FIG. 4 a single element in perspective view, and FIG. 5 a partial longitudinal section through the hydrostatic bearing according to the invention.

The hydrostatic bearing according to the invention illustrated in FIGS. 1 and 2 shows, in a perspective view, a support element 1, which is supported on a guide rail 2 so that it can move longitudinally. The guide rail 2 is divided into two sections: a trapezoidal guide section 3 and a trapezoidal mounting section 4. The two trapezoidal sections 3, 4 are turned toward each other with their tapered sides and are connected to each other integrally by a transition section 5.

The guide section 3 has a head-side guide surface 6. A foot-side mounting surface 7 of the mounting section 4 is formed parallel to the head-side guide surface 6 on the opposite side of the guide rail 2. Lateral guide surfaces 8 connect to both longitudinal sides or edges of the head-side guide surface 6, wherein these lateral guide surfaces 8 are arranged with an angle $\alpha$ inclined relative to the head-side guide surface 6.

The mounting section 4 has lateral foot surfaces 9, which are arranged inclined at an angle $\gamma$ to the mounting surface 7.

FIG. 2 also shows that the lateral guide surfaces 8 of the guide section 3 and the lateral foot surfaces 9 of the mounting section 4 intersect at an angle $\beta$.

The support element 1 has a support body 10 and two head pieces 11, which are arranged on both end sides of the support body 10. The support element 1 has two legs 12 and a base 13 connecting the two legs 12, wherein the support element 1 wraps around the guide rail 2 with its two legs 12.

In FIG. 2, the support body 10 is cut transversely, wherein the two head pieces 11 are left off. In this representation, pressure pockets 14, which are formed on two legs 12 and on the base 13 on their sides facing the guide rail 2, can be seen clearly. These pressure pockets 14 can be pressurized hydraulically for building up a hydrostatic pressure between the guide rail 2 and the support element 1.

For this hydrostatic bearing according to the invention, the two lateral guide surfaces 8 of the guide section 2 are arranged at an angle $\alpha$ equal to 55° to the head-side guide surface 6 of the guide section 3. At this inclination of the guide surfaces relative to each other, according to the invention significantly higher load ratings can be achieved than for known hydrostatic bearings. This angle a can equal at least 35° and at most 75°, wherein an optimum for the carrying capacity was determined at 55°.

The lateral foot surfaces 9 of the mounting section 4 are arranged at an angle between 10 and 25° inclined relative to the foot-side mounting surface 7 of the mounting section 4. With the angles $\alpha$ and $\gamma$ proposed here, angles $\beta$ are created between the lateral guide surfaces 8 and the lateral foot surfaces 9, which can be given between 45 and 100°. The support element 1 has inner contours, which are adapted to the outer contours of the guide rail 2. The inner sides of the two legs 12 are also arranged relative to the inner side of the base 13 at the angle $\alpha$ of the guide rail 2.

FIG. 1 shows boreholes 15, which are provided on the head piece 11 and in which typical chokes or flow control valves not shown here are inserted. These boreholes 15 are connected hydraulically to pressure channels 16, which are connected to the pressure pockets 14. In FIG. 2, the pressure channels provided in the support body 10 are shown in section. The pressure channels 16 are pressurized with hydraulic fluid, for example, hydraulic oil, wherein the pressure in the pressure pockets 14 can be set precisely by adjusting the not shown chokes or flow control valves.

The pressure pocket 14 shown on the base 13 of the support element 1 is divided by a separating ridge 17 arranged along the guide rail 2. Each divided pocket is connected hydraulically to a separate pressure channel 16.

Figure 4:
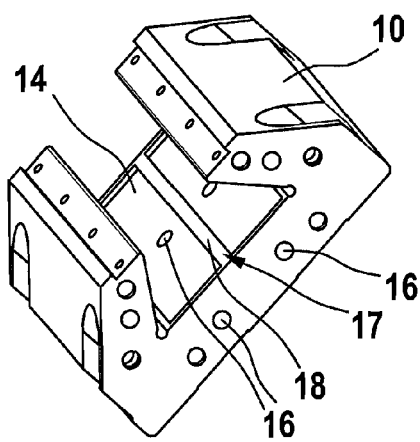

This pressure pocket 14 formed on the base 13 with the separating ridge 17 can be seen clearly in FIG. 4. The separating ridge 17 is provided on its side facing the guide rail 2 with a support surface 18 for contact on the guide surface 6 of the guide section 3 of the guide rail 2: if the hydrostatic pressure built-up in the pressure pocket 14 is not sufficient under an applied load, then the support element 1 comes into contact with the support surface 18 on the guide rail 2. The support surface is designed so that another method of the support element 1 on the guide rail 2 is possible. This support surface 18 is used as overload protection and can also be viewed as a fail-safe device if the hydrostatic pressure completely breaks down.

Under the applied hydrostatic pressure, hydraulic fluid can escape from the pressure pockets 14. This escaping hydraulic fluid can be discharged via return channels and prepared again for further use, for example, in an external reservoir.

Figure 3:
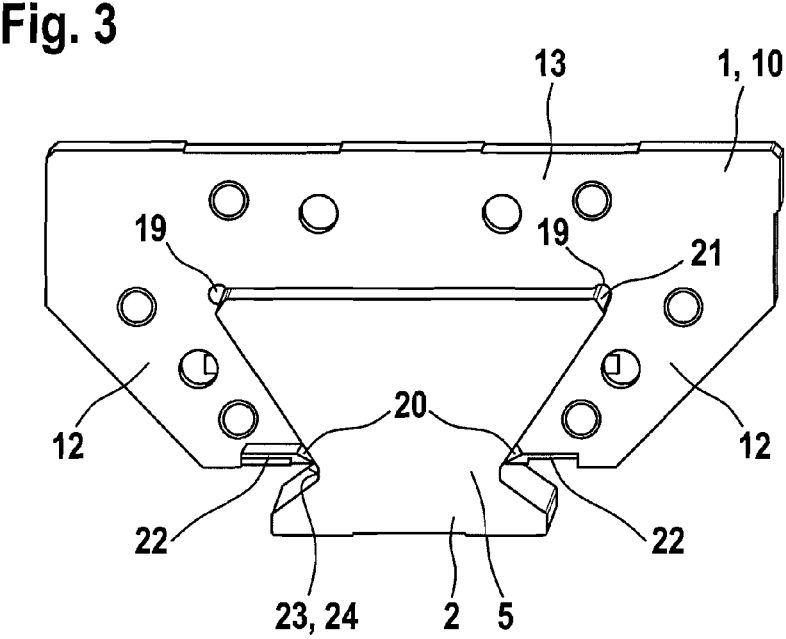

FIG. 3 shows return channels 19, 20. In this figure, a part of the support body 10 cut transversely is shown together with a part of the guide rail 2 cut transversely. The two return channels 19 are arranged along the guide rail 2 in corner regions formed by the base 13 and the two legs 12 of the support element 1. These return channels 19 are formed as open grooves and are limited on their open longitudinal sides by flattened sections 21 formed on the guide rail 2. These flattened sections 21 are provided in an edge region, which is formed by the lateral guide surfaces 8 and the head-side guide surface 6 of the guide section 3 of the guide rail 2.

The support element 1 is further provided with two longitudinal seals 22, which are arranged on the two free ends of the two legs 12. The two longitudinal seals 22 contact the guide rail 2. The two longitudinal seals 22 are shown in section in FIG. 3. These longitudinal seals 22 contact a contact surface 23 of the guide rail 2. These contact surfaces 23 are formed on the transition section 5 on their longitudinal sides lying opposite each other. The contact surfaces 23 connect to the lateral guide surfaces 8 of the guide section 3 and to the lateral foot surfaces 9 of the mounting section 4. These contact surfaces 23 can be constructed as flat surfaces, but they can also be concave. These contact surfaces 23 form transition surfaces 24, which connect to the lateral guide surfaces 8 of the guide section 3 and to the lateral foot surfaces of the mounting section 4. These longitudinal seals 22 limit the already mentioned return channel 20. Hydraulic fluid, which escapes from the pressure pockets 14 formed on the two legs 12, is led into the return channel 20.

Figure 5:
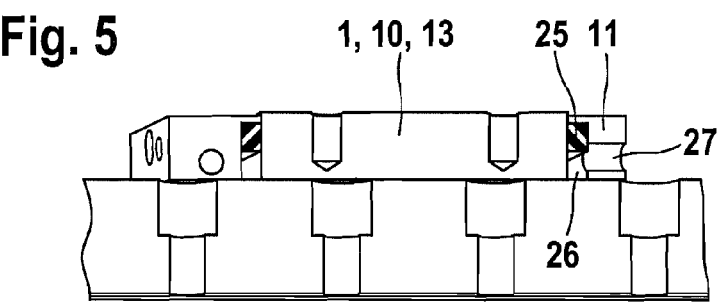

FIG. 5 shows a partial longitudinal section through the hydrostatic bearing according to the invention. What is to be taken from this figure is that the head piece 11 is provided with a front seal 25. The front seal continues in a manner not illustrated and wraps around the guide rail 2 and contacts the lateral and the head-side guide surface 6, 8 of the guide section 3 of the guide rail 2. This front seal 25 also limits the one collection channel 26, in which returned hydraulic fluid is led from the return channels 19, 20. This returned hydraulic fluid is led via the collection channel 26 into the central return location 27, which is provided on the head piece 11. A pipe line not shown here for returning the hydraulic fluid into a similarly not shown reservoir can be connected to this central return location 27.

LIST OF REFERENCE SYMBOLS

1 Support element
2 Guide rail
3 Guide section
4 Mounting section
5 Transition section
6 Head-side guide surface
7 Foot-side mounting surfaces
8 Lateral guide surface
9 Lateral foot surface
10 Support body
11 Head piece
12 Leg
13 Base
14 Pressure pocket
15 Borehole
16 Pressure channel
17 Separating ridge
18 Support surface
19 Return channel
20 Return channel
21 Flattened section
22 Longitudinal seal
23 Contact surface
24 Transition surface
25 Front seal
26 Collection channel
27 Central return location

The invention claimed is:

1. Hydrostatic bearing for supporting horizontal and vertical forces, comprising a guide rail,
the guide rail has a trapezoidal guide section and a trapezoidal mounting section, wherein the sections have tapered sides that face each other,
a head-side guide surface of the guide section and a mounting surface of the mounting section face away from each other and arranged parallel to each other,
lateral guide surfaces of the guide section are each arranged at an angle α to the head-side guide surface,
lateral foot surfaces of the mounting section are arranged at an angle γ to the mounting surface,
the lateral guide surfaces of the guide section and the lateral foot surfaces of the mounting section enclose an angle β, and a support element supported hydrostatically on the guide rail,
the support element has two legs and a base connecting the two legs, the support element wraps around the guide rail with the two legs,
the two legs and the base are each provided on sides thereof facing the guide rail with at least one pressure pocket that is pressurizable hydraulically for building up a hydrostatic pressure between the guide rail and the support element,
the angle α between the head-side and the lateral guide surface of the guide section is greater than or equal to 35 degrees and less than or equal to 75 degrees, and the angle γ between the mounting surface and the lateral foot surface of the mounting section is greater than or equal to 10 degrees and less than or equal to 25 degrees.

2. Hydrostatic bearing according to claim 1, wherein the angle α between the head-side and the lateral guide surface of the guide section equals 55 degrees.

3. Hydrostatic bearing according to claim 1, wherein at least the pressure pocket provided on the base of the support element is divided by a separating ridge arranged along the guide rail.

4. Hydrostatic bearing according to claim 3, wherein the separating ridge is provided on a side facing the guide rail with a support surface for contacting the guide surface of the guide section.

5. Hydrostatic bearing according to claim 1, wherein the support element has a support body provided with the pressure pockets and two head pieces arranged on both ends of the support body, wherein there are pressure channels, which connect to the pressure pockets and which are provided with chokes for regulating a flow rate of hydraulic fluid in at least one of the two head pieces.

6. Hydrostatic bearing according to claim 5, wherein the support element is also provided with return channels, which open into at least one of the two head pieces, wherein returning hydraulic fluid can be discharged via a return location provided on the head piece.

7. Hydrostatic bearing according to claim 6, wherein the support element is provided with two return channels, which are arranged along the guide rail and which are each arranged in a corner region formed by the base and one of the two legs of the support element.

8. Hydrostatic bearing according to claim 7, wherein the return channel is formed as an open groove and is limited on an open longitudinal side thereof by the guide rail.

9. Hydrostatic bearing according to claim 8, wherein the guide section of the guide rail has a flattened section, which extends along the guide rail and which limits the return channel, in an edge region formed by the lateral guide surface and the head-side guide surface thereof.

10. Hydrostatic bearing according to claim 5, wherein the head piece is provided with a front seal.

11. Hydrostatic bearing according to claim 10, wherein the front seal limits a collection channel, by which the hydraulic fluid is led from return channels into a central return location of the head piece.

12. Hydrostatic bearing according to claim 1, wherein the support element is provided at each free end of the two legs with a longitudinal seal, which contacts the guide rail.

13. Hydrostatic bearing according to claim 12, wherein the longitudinal seal limits a return channel.

14. Hydrostatic bearing according to claim 1, wherein a transition section, which connects the mounting section integrally to the guide section, is provided between the trapezoidal guide section and the trapezoidal mounting section.

15. Hydrostatic bearing according to claim 14, wherein the transition section is provided on longitudinal sides thereof lying opposite each other with straight or concave transition surfaces, which connect to the lateral guide surfaces of the guide section and to the lateral foot surfaces of the mounting section.

16. Hydrostatic bearing according to claim 15, wherein the transition surfaces are constructed as a contact surface for longitudinal seals of the support element.

* * * * *